United States Patent
Tani

(10) Patent No.: US 9,323,048 B2
(45) Date of Patent: Apr. 26, 2016

(54) OPTICAL DEFLECTOR INCLUDING MEANDER-TYPE PIEZOELECTRIC ACTUATORS COUPLED BY CROSSING BARS THEREBETWEEN

(71) Applicant: STANLEY ELECTRIC CO., LTD., Meguro-ku, Tokyo (JP)

(72) Inventor: Masanao Tani, Yamato (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 228 days.

(21) Appl. No.: 14/217,102

(22) Filed: Mar. 17, 2014

(65) Prior Publication Data

US 2014/0268271 A1    Sep. 18, 2014

(30) Foreign Application Priority Data

Mar. 18, 2013  (JP) .................................. 2013-054964

(51) Int. Cl.
  *G02B 26/08*  (2006.01)
  *G02B 26/10*  (2006.01)

(52) U.S. Cl.
  CPC .......... *G02B 26/0858* (2013.01); *G02B 26/101* (2013.01); *G02B 26/105* (2013.01)

(58) Field of Classification Search
  CPC .......... G02B 26/0858; G02B 26/0833; G01B 26/101
  USPC .......... 359/198.1–199.1, 199.4, 200.8, 202.1, 359/224.1, 224.2
  See application file for complete search history.

(56) References Cited

U.S. PATENT DOCUMENTS

| | | | |
|---|---|---|---|
| 2009/0237628 A1* | 9/2009 | Furukawa | G02B 26/0858 353/98 |
| 2012/0120470 A1 | 5/2012 | Kitazawa et al. | |
| 2013/0301103 A1* | 11/2013 | Aimono | G02B 26/08 359/224.1 |

FOREIGN PATENT DOCUMENTS

| | | |
|---|---|---|
| JP | 2008-040240 A | 2/2008 |
| JP | 2012-123364 A | 6/2012 |
| WO | 2010131556 A1 | 11/2010 |

OTHER PUBLICATIONS

Extended European Search Report dated Jul. 21, 2014 in counterpart European Application No. 14020032.0.

(Continued)

*Primary Examiner* — James Phan
(74) *Attorney, Agent, or Firm* — Holtz, Holtz & Volek PC

(57) ABSTRACT

In an optical deflector including a mirror, a fixed frame surrounding the mirror, and first and second piezoelectric actuators of a meander-type provided opposite to each other with respect to the mirror, for rocking the mirror around an axis on a plane of the fixed frame, the first piezoelectric actuator includes a plurality of first piezoelectric cantilevers folded at first folded portions and coupled to the fixed frame, and the second piezoelectric actuator includes a plurality of second piezoelectric cantilevers folded at second folded portions and coupled to the fixed frame. The optical deflector further includes at least one first crossing bar coupled between one of the first folded portions and one of the second folded portions symmetrically located with respect to the mirror.

9 Claims, 14 Drawing Sheets

(56) References Cited

OTHER PUBLICATIONS

Tani, et al., "A Two-Axis Piezoelectric Tilting Micromirror with a Newly Developed PZT-Meandering Actuator", Micro Electric Mechanical Systems; MEMS. IEEE 20th International Conference on. IEEE, PI; XP031203748; ISBN: 978-1-4244-0950-1, Jan. 1, 2007, pp. 699-702.

* cited by examiner

Fig. 3
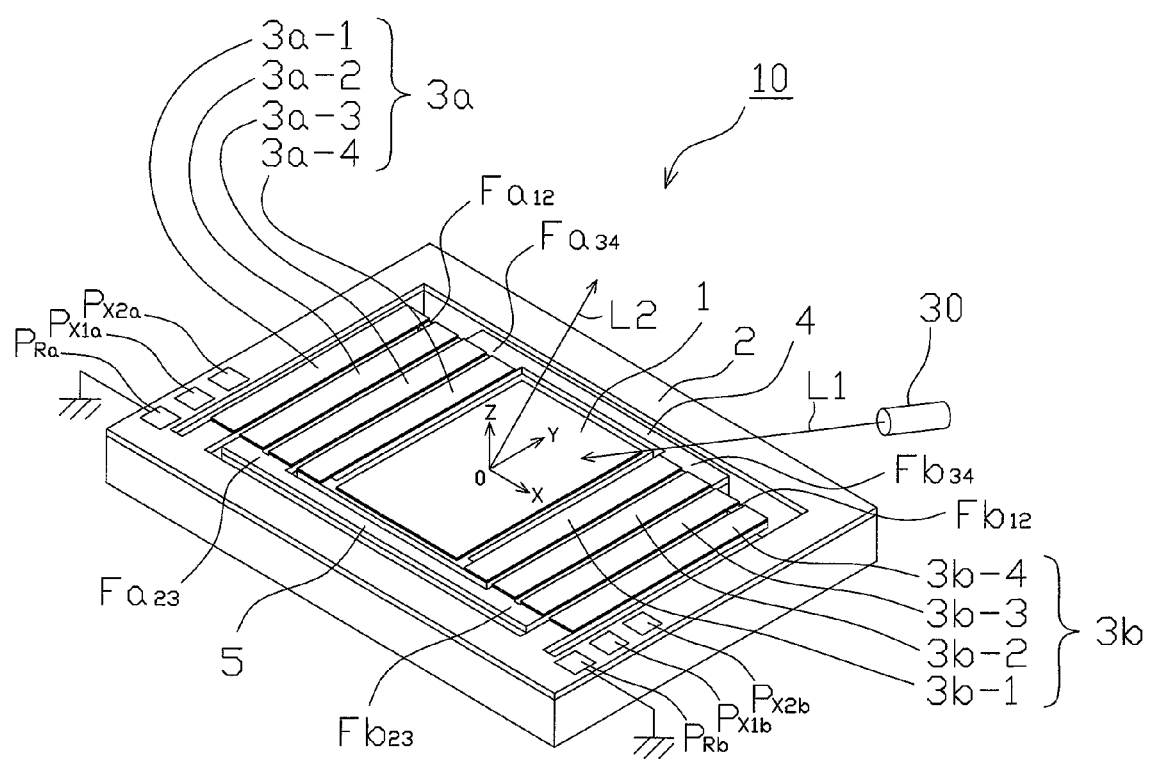
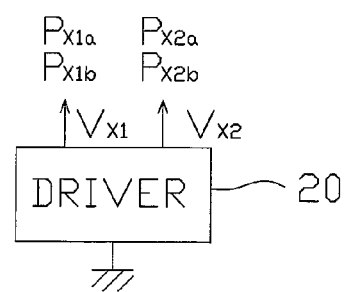

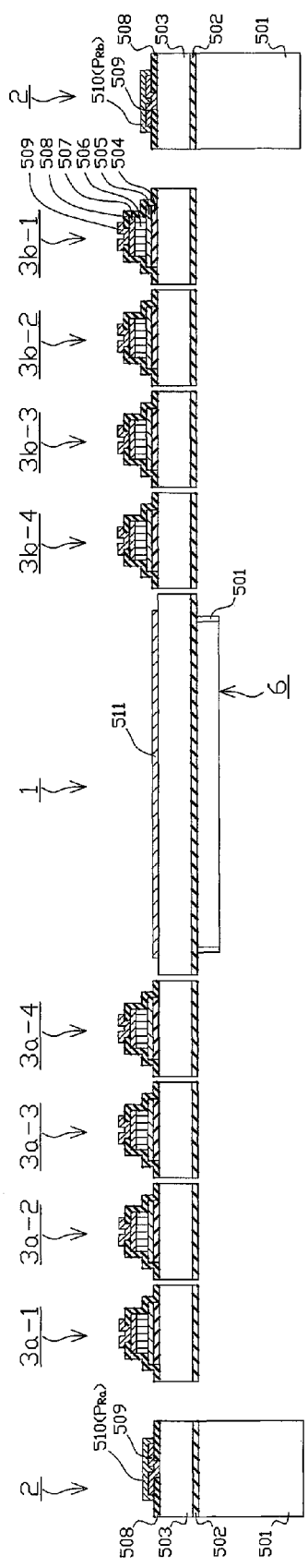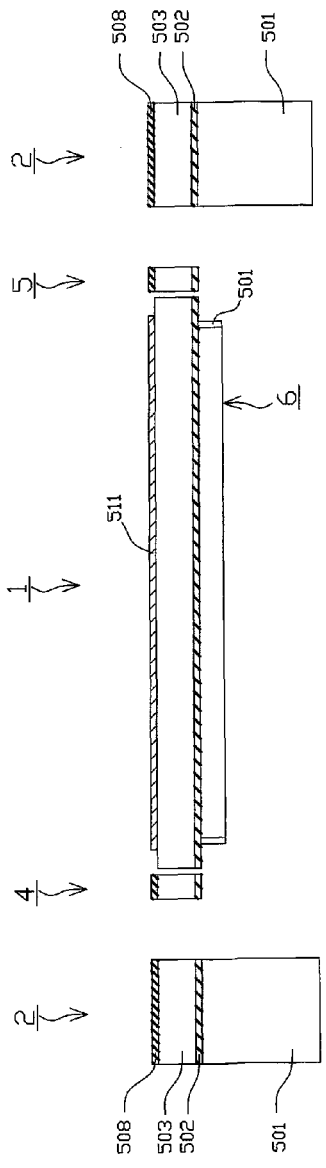
Fig. 5A
Fig. 5B

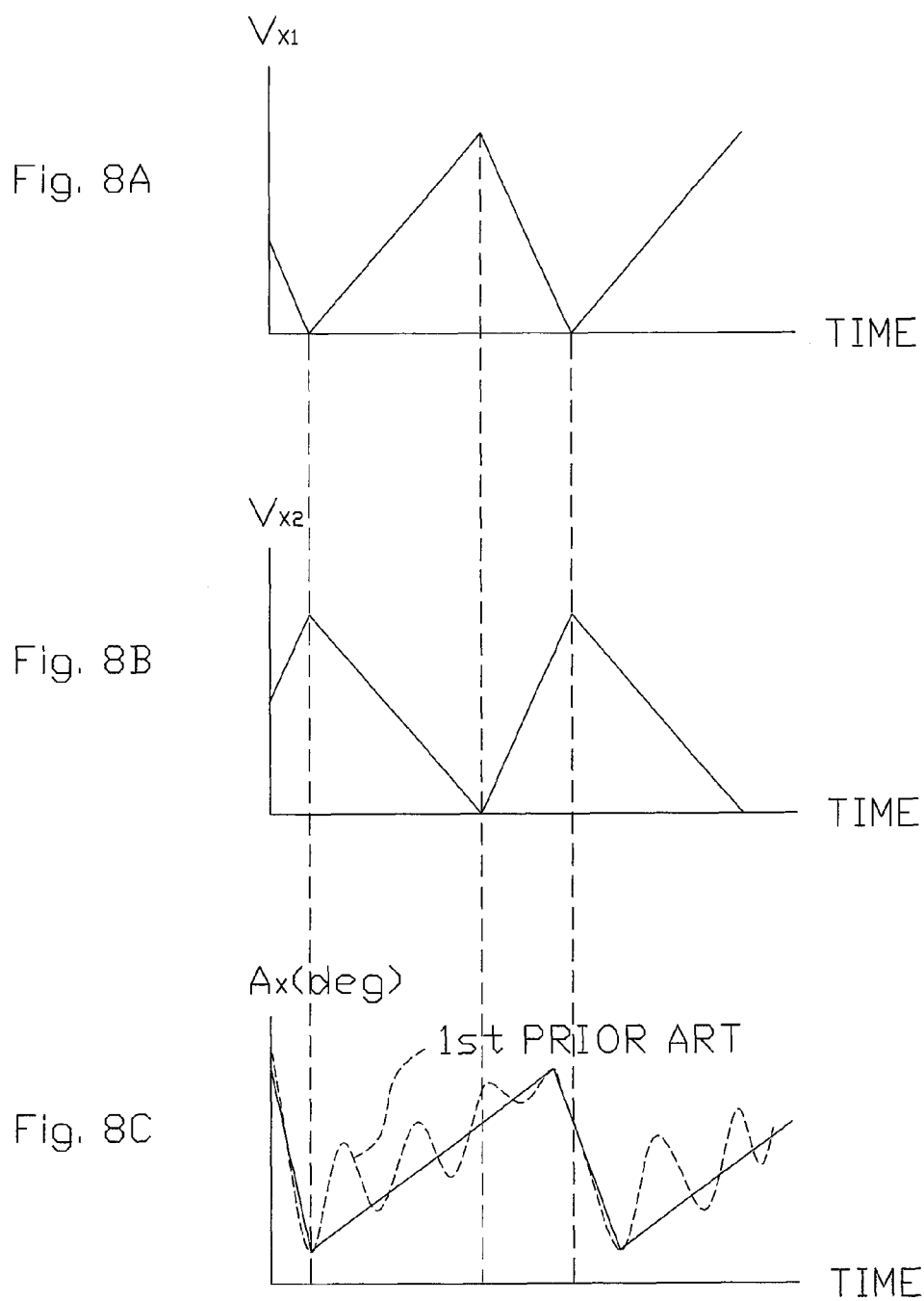

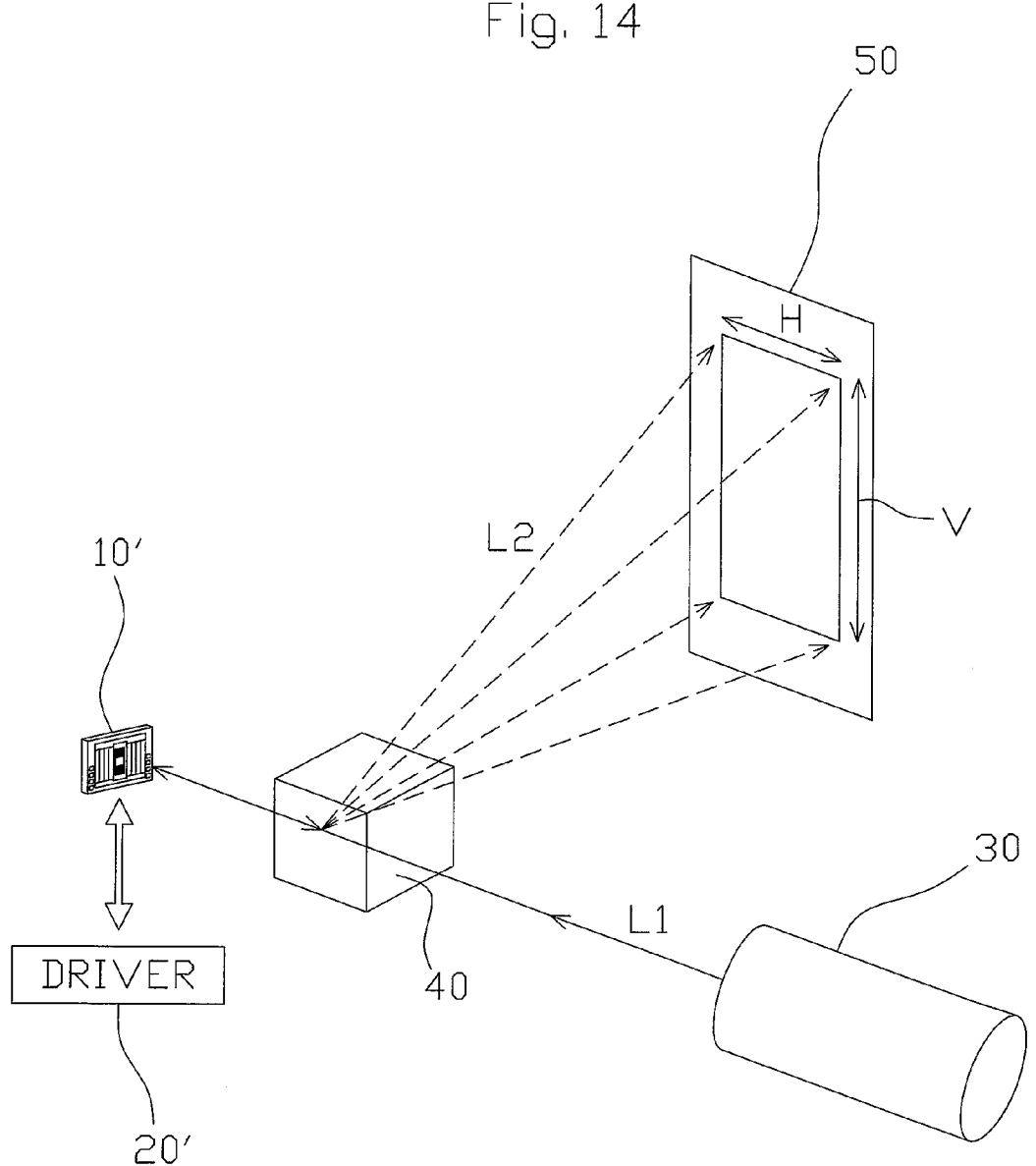

OPTICAL DEFLECTOR INCLUDING MEANDER-TYPE PIEZOELECTRIC ACTUATORS COUPLED BY CROSSING BARS THEREBETWEEN

This application claims the priority benefit under 35 U.S.C. §119 to Japanese Patent Application No. JP2013-054964 filed on Mar. 18, 2013, which disclosure is hereby incorporated in its entirety by reference.

BACKGROUND

1. Field

The presently disclosed subject matter relates to an optical deflector including meander-type piezoelectric actuators.

2. Description of the Related Art

Generally, in an optical scanner or the like, an optical deflector is constructed by a micro electro mechanical system (MEMS) device manufactured by using semiconductor manufacturing processes and micro machine technology.

A first prior art optical deflector as a MEMS device is constructed by a mirror, a fixed frame surrounding the mirror, and a pair of meander-type piezoelectric actuators coupled between the fixed frame and the mirror and serving as cantilevers for rocking the mirror with respect to a rocking axis of the mirror (see: JP2008-040240A).

In the above-described first prior art optical deflector, when the position and direction of the rocking axis of the mirror are deviated from those of an axis such as an X-axis on the plane of the fixed frame while the mirror is being rocked, an irradiated area cannot accurately be scanned with light reflected from the mirror. Therefore, accurate control voltages of saw-tooth waves or the like need to be applied to the meander-type piezoelectric actuators, so that the cantilevers of one of the meander-type piezoelectric actuators are aligned symmetrically with the cantilevers of the other. In more detail, if another axis perpendicular to the X-axis is defined by an Y-axis on the plane of the fixed frame and an axis normal to the plane of the fixed frame is defined by a Z-axis, a tip of one cantilever on the side of one of the meander-type piezoelectric actuators and a tip of its corresponding cantilever on the side of the other meander-type piezoelectric actuator should have the same positions on the Y-axis and the Z-axis and opposite positions on the X-axis with respect to their origin.
However, it is actually difficult to symmetrically align the cantilevers of one of the meander-type piezoelectric actuators with those of the other, due to the manufacturing fluctuations between the pair of meander-type piezoelectric actuators.

Also, since the meander-type piezoelectric actuators are very brittle, the meander-type piezoelectric actuators would easily be displaced by an external impact. Therefore, when unexpected relative displacements occur in the positions of the meander-type piezoelectric actuators with respect to the plane of the fixed frame by such an external impact, the meander-type piezoelectric actuators would interfere with the mirror, and would be twisted or deformed to be broken down.

Next, the natural frequencies of the first prior art optical deflector will be explained with reference to FIGS. 1A, 1B and 1C and FIG. 2.

In FIGS. 1A, 1B and 1C, a mirror 101 is surrounded by a fixed frame (not shown), and a pair of meander-type piezoelectric actuators 102a and 102b are coupled between the fixed frame and the mirror 101. The piezoelectric actuator 102a is constructed by serially-coupled piezoelectric cantilevers 102a-1, 102a-2, 102a-3 and 102a-4 in parallel with the Y-axis of the fixed frame, and the piezoelectric actuator 102b is constructed by serially-coupled piezoelectric cantilevers 102b-1, 102b-2, 102b-3 and 102b-4 in parallel with the Y-axis of the fixed frame.

In FIG. 1A, which shows a normal mode whose natural frequency is $f_{n0}$ as shown in FIG. 2, the Y-axis positions and Z-axis positions of the piezoelectric cantilevers 102a-1, 102a-2, 102a-3 and 102a-4 are the same as those of the piezoelectric cantilevers 102b-1, 102b-2, 102b-3 and 102b-4, respectively. On the other hand, the X-axis positions of the piezoelectric cantilevers 102a-1, 102a-2, 102a-3 and 102a-4 are symmetrical with the X-axis positions of the piezoelectric cantilevers 102b-1, 102b-2, 102b-3 and 102b-4, respectively, with respect to the origin O. Thus, the mirror 101 is rocked around the X-axis. Note that the natural frequency $f_{n0}$ is determined by a mechanically-vibrating system of the mirror 101 around the X-axis depending upon the piezoelectric actuators 102a and 102b.

In FIG. 1B, which shows a first abnormal mode whose natural frequency is $f_{n1}$ ($>f_{n0}$) as shown in FIG. 2, the Z-axis position at a folded portion $Fa_{34}$ between the piezoelectric cantilevers 102a-3 and 102a-4 is opposite to the Z-axis position at a folded portion $Fb_{34}$ between the piezoelectric cantilevers 102b-3 and 102b-4 with respect to the origin O. Note that the folded portion $Fa_{34}$ and $Fb_{34}$ are the closest ones to the mirror 101.

In FIG. 1C, which shows a second abnormal mode whose natural frequency is $f_{n2}$ ($>f_{n1}$) as shown in FIG. 2, the Z-axis position at a folded portion $Fa_{23}$ between the piezoelectric cantilevers 102a-2 and 102a-3 is opposite to the Z-axis position at a folded portion $Fb_{23}$ between the piezoelectric cantilevers 102b-2 and 102b-3 with respect to the origin O. Note that the folded portions $Fa_{23}$ and $Fb_{23}$ are the second closest ones to the mirror 101.

Similarly, in a third abnormal mode whose natural frequency is $f_{n3}$ ($>f_{n2}$) as shown in FIG. 2, the Z-axis position at a folded portion $Fa_{12}$ between the piezoelectric cantilevers 102a-1 and 102a-2 is opposite to the Z-axis position at a folded portion $Fb_{12}$ between the piezoelectric cantilevers 102b-1 and 102b-2 with respect to the origin O. Note that the folded portions $Fa_{12}$ and $Fb_{12}$ are the third closest ones to the mirror 101.

Additionally, when the Y-axis position at the folded portion $Fa_{34}$ is opposite to the Y-axis position at the folded portion $Fb_{34}$ with respect to the origin O, when the Y-axis position at the folded portion $Fa_{23}$ is opposite to the Y-axis position at the folded portion $Fb_{23}$ with respect to the origin O, or when the Y-axis position at the folded portion $Fa_{12}$ is opposite to the Y-axis position at the folded portion $Fb_{12}$ with respect to the origin O, other natural frequencies which are not shown in FIG. 2 may be determined.

In FIG. 2, $f_{n0}/2$ is a half natural frequency of the natural frequency $f_{n0}$.

Thus, when saw-tooth wave control voltages having a frequency close to the natural frequency $f_{n0}$ of the normal mode are applied to the piezoelectric actuators 102a and 102b, the saw-tooth wave control voltages would resonate with the natural frequency $f_{n0}$ in the normal mode to enhance the deflection angle of the mirror 101. In this case, however, higher harmonic components of the saw-tooth wave control voltages would also resonate with the natural frequencies $f_{n1}$, $f_{n2}$, $f_{n3}$, . . . in the abnormal modes so that such natural frequencies $f_{n1}$, $f_{n2}$, $f_{n3}$, . . . would appear in the deflection angle of the mirror 101 as spurious noises.

In order to suppress the deformation of the meander-type piezoelectric actuators by an external impact and move away from the components of the natural frequencies $f_{n1}$, $f_{n2}$, $f_{n3}$, . . . in the abnormal modes, a second prior art optical deflector as a MEMS device additionally includes damper elements thinly coated on the rear surfaces of the meander-type piezoelectric actuators. The damper elements are made of gel material with high viscosity. The gel material can be a heating or ultraviolet curable gel material which is cured by heating or ultraviolet irradiation (see: US2012/0120470A1 & JP2012-123364A).

In the above-described second prior art optical deflector, however, since a process for coating gel material thinly on the meander-type piezoelectric actuators and a process for curing the gel material are required, the manufacturing cost would be increased. Also, since the viscosity of gel material of one of the meander-type piezoelectric actuators would be different from that of the other, due to the manufacturing fluctuations, the cantilevers of one of the meander-type piezoelectric actuators would be asymmetrical to those of the other of the meander-type piezoelectric actuators, which would invite the interference of the piezoelectric actuators with the mirror and would twist or deform the meander-type piezoelectric actuators to be broken down. Further, since the damper elements cannot completely avoid the asymmetrical Z-axis motions of the folded portions, the components of the natural frequencies in the abnormal modes near the natural frequency in the normal mode cannot completely be moved away.

SUMMARY

The presently disclosed subject matter seeks to solve the above-described problems.

According to the presently disclosed subject matter, in an optical deflector including a mirror, a fixed frame surrounding the mirror, and first and second piezoelectric actuators of a meander-type provided opposite to each other with respect to the mirror, for rocking the mirror around an axis on a plane of the fixed frame, the first piezoelectric actuator includes a plurality of first piezoelectric cantilevers folded at first folded portions and coupled to the fixed frame, and the second piezoelectric actuator includes a plurality of second piezoelectric cantilevers folded at second folded portions and coupled to the fixed frame. The optical deflector further includes at least one first crossing bar coupled between one of the first folded portions and one of the second folded portions symmetrically located with respect to the mirror.

According to the presently disclosed subject matter, since no additional process is required for forming the crossing bar, the manufacturing cost would not be increased.

Also, since the natural frequencies in the abnormal modes near the natural frequency in the normal mode are moved away by the crossing bar, the resonance at the natural frequency in the normal mode can be enhanced.

Further, since the crossing bar keeps the spacing between the first and second piezoelectric cantilevers, the meander-type piezoelectric actuators would not interfere with the mirror, and would not be twisted or deformed to be broken down.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art wherein:

FIG. 3 is a perspective view illustrating a first embodiment of the optical deflector according to the presently disclosed subject matter;

FIGS. 5A and 5B are cross-sectional views taken along the line VA-VA and VB-VB, respectively, in FIG. 4;

FIGS. 8A, 8B and 8C are timing diagrams for illustrating examples of the drive voltages and the deflection angle of the optical deflector of FIGS. 3 and 4;

FIG. 14 is a diagram illustrating an image display apparatus to which the two-dimensional optical deflector of FIGS. 11 and 12 is applied.

DETAILED DESCRIPTION OF EXEMPLARY EMBODIMENTS

Figure 4:
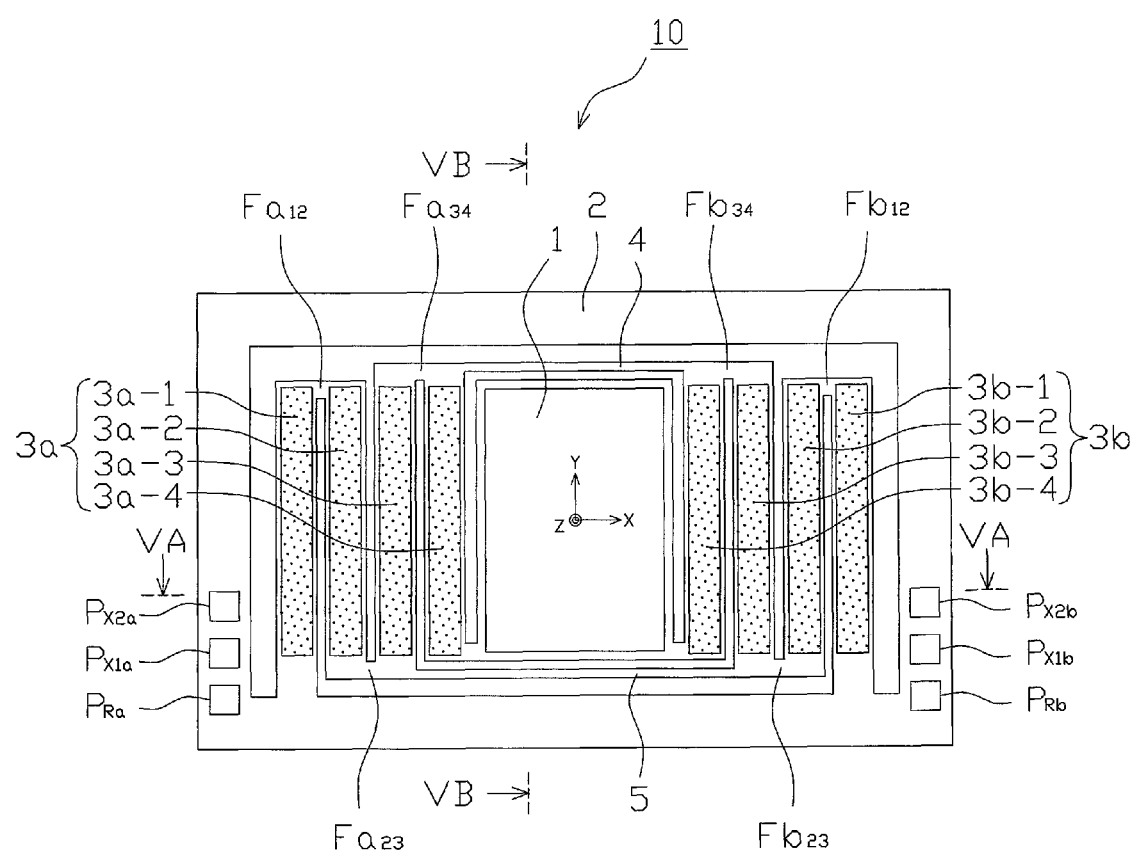
FIG. 4 is a plan view of the optical deflector of FIG. 3.

In FIGS. 3 and 4, which illustrate a first embodiment of the optical deflector according to the presently disclosed subject matter, reference numeral 10 designates a one-dimensional optical deflector, and 20 designates a driver for driving the optical deflector 10.

The optical deflector 10 is constructed by a rectangular mirror 1 for reflecting an incident light, a fixed frame 2 surrounding the mirror 1 for supporting the mirror 1, and a pair of meander-type piezoelectric actuators 3a and 3b coupled between the fixed frame 2 and the mirror 1 and serving as cantilevers for rocking the mirror 1 around an X-axis of the plane of the fixed frame 2 centered at the center of the mirror 1. The mirror 1 can be circular. The piezoelectric actuators 3a and 3b are arranged opposite to each other with respect to the mirror 1.

Note that a Y-axis perpendicular to the X-axis is defined on the plane of the fixed frame 2, and a normal axis to the plane of the fixed frame 2 is defined by a Z-axis centered at the center of the mirror 1.

The fixed frame 2 is rectangularly-framed to surround the mirror 1 associated with the piezoelectric actuators 3a and 3b.

The piezoelectric actuator 3a is constructed by piezoelectric cantilevers 3a-1, 3a-2, 3a-3 and 3a-4 which are serially-coupled from the fixed frame 2 to the mirror 1 via folded portions $Fa_{12}$, $Fa_{23}$ and $Fa_{34}$. The folded portions $Fa_{12}$ and $Fa_{34}$ are located on the positive side of the Y-axis, while the folded portion $Fa_{23}$ is located on the negative side of the Y-axis. Also, each of the piezoelectric cantilevers 3a-1, 3a-2, 3a-3 and 3a-4 are in parallel with the Y-axis. Therefore, the piezoelectric cantilevers 3a-1, 3a-2, 3a-3 and 3a-4 are folded at every cantilever or meandering from the fixed frame 2 to the mirror 1, so that the amplitudes of the piezoelectric cantilevers 3a-1, 3a-2, 3a-3 and 3a-4 can be changed along directions perpendicular to the X-axis.

Similarly, the piezoelectric actuator 3b is constructed by piezoelectric cantilevers 3b-1, 3b-2, 3b-3 and 3b-4 which are serially-coupled from the fixed frame 2 to the mirror 1 via folded portions $Fb_{12}$, $Fb_{23}$ and $Fb_{34}$. The folded portions $Fb_{12}$ and $Fb_{34}$ are located on the positive side of the Y-axis, while the folded portion $Fb_{23}$ is located on the negative side of the Y-axis. Also, each of the piezoelectric cantilevers 3b-1, 3b-2, 3b-3 and 3b-4 are in parallel with the Y-axis. Therefore, the piezoelectric cantilevers 3b-1, 3b-2, 3b-3 and 3b-4 are folded at every cantilever or meandering from the fixed frame 2 to the mirror 1, so that the amplitudes of the piezoelectric cantilevers 3b-1, 3b-2, 3b-3 and 3b-4 can be changed along directions perpendicular to the X-axis.

Note that the number of piezoelectric cantilevers in each of the piezoelectric actuators 3a and 3b can be other values such as 2, 6, 8, . . . .

Provided on the fixed frame 2 are pads $P_{Ra}$, $P_{X1a}$, $P_{X2a}$, $P_{Rb}$, $P_{X1b}$ and $P_{X2b}$. The pads $P_{X1a}$, $P_{X2b}$, $P_{X1b}$ and $P_{X2b}$ are connected to the driver 20 which applies a drive voltage $V_{X1}$ to the pads $P_{X1a}$ and $P_{X1b}$, and applies a drive voltage $V_{X2}$ to the pads $P_{X2a}$ and $P_{X2b}$. In this case, the drive voltages $V_{X1}$ and $V_{X2}$ are opposite in phase to each other.

The pad $P_{Ra}$ for receiving a reference voltage $V_R$ is connected via via-structures (not shown) to the lower electrode layers 505 (see: FIG. 5A) of the piezoelectric cantilevers 3a-1, 3a-2, 3a-3 and 3a-4 of the piezoelectric actuator 3a. In this case, the pad $P_{Ra}$ is grounded, i.e., the reference voltage $V_R$ is 0V.

The pad $P_{X1a}$ is connected via a wiring layer 509 (see: FIG. 5A) to the upper electrode layers 507 (see: FIG. 5A) of the odd-numbered piezoelectric cantilevers 3a-1 and 3a-3 of the piezoelectric actuator 3a.

The pad $P_{X2a}$ is connected via a wiring layer 509 (see: FIG. 5A) to the upper electrode layers 507 (see: FIG. 5A) of the even-numbered piezoelectric cantilevers 3a-2 and 3a-4 of the piezoelectric actuator 3a.

The pad $P_{Rb}$ for receiving the reference voltage $V_R$ is connected via via-structures (not shown) to the lower electrode layers 505 (see: FIG. 5A) of the piezoelectric cantilevers 3b-1, 3b-2, 3b-3 and 3b-4 of the piezoelectric actuator 3b. In this case, since the reference voltage $V_R$ is 0V, the pad $P_{Rb}$ is grounded.

The pad $P_{X1b}$ is connected via a wiring layer 509 (see: FIG. 5A) to the upper electrode layers 507 (see: FIG. 5A) of the odd-numbered piezoelectric cantilevers 3b-1 and 3b-3 of the piezoelectric actuator 3b.

The pad $P_{X2b}$ is connected via a wiring layer 509 (see: FIG. 5A) to the upper electrode layers 507 (see: FIG. 5A) of the even-numbered piezoelectric cantilevers 3b-2 and 3b-4 of the outer piezoelectric actuator 3b.

A crossing bar 4 is provided along the X-axis on the positive side of the Y-axis to couple the folded portion $Fa_{34}$ to the folded portion $Fb_{34}$, so as to prevent the Z-axis motion of the folded portion $Fa_{34}$ from being opposite to the Z-axis motion of the folded portion $Fb_{34}$. In this case, the X-axis positions of the folded portions $Fa_{34}$ and $Fb_{34}$ are fixed by the crossing bar 4.

Similarly, a crossing bar 5 is provided along the X-axis on the negative side of the Y-axis to couple the folded portion $Fa_{23}$ to the folded portion $Fb_{23}$, so as to prevent the Z-axis motion of the folded portion $Fa_{23}$ from being opposite to the Z-axis motion of the folded portion $Fb_{23}$. In this case, the X-axis positions of the folded portions $Fa_{23}$ and $Fb_{23}$ are fixed by the crossing bar 5.

Also, a circular reinforcing rib 6 (shown not in FIGS. 3 and 4, but in FIGS. 5A and 5B) is provided on the rear surface of the mirror 1 to avoid the warping of the mirror 1.

The driver 20 is constructed by a control circuit such as a microcomputer including a central processing unit (CPU), a read-only memory (ROM) or a nonvolatile memory, a random access memory (RAM), an input/output (I/O) interface and the like.

In FIG. 3, light L1 emitted from a light source 30 is reflected by the mirror 1, and then, light L2 reflected from the mirror 1 is deflected by the optical deflector 10. Thus, an irradiation area of a screen (not shown) is scanned with the deflected reflected light L2. This will be explained in more detail with reference to FIG. 14.

The structure of each element of the optical deflector 10 is explained next with reference to FIGS. 5A and 5B which are cross-sectional views taken along the VA-VA line and the VB-VB line, respectively, in FIG. 4.

In FIGS. 5A and 5B, a monocrystalline silicon support layer ("Handle" layer) 501, an intermediate silicon dioxide layer ("Box" layer) 502 and a monocrystalline silicon active layer ("Device" layer) 503 are formed by a silicon-on-insulator (SOI) substrate. Also, reference numeral 504 designates silicon dioxide layer, 505 designates a Ti/Pt lower electrode layer made of Ti or $TiO_X$ ($0<x\leq2$) and Pt, 506 designates a lead titanate zirconate (PZT) layer, 507 designates a Pt upper electrode layer made of Pt, 508 designates an insulating interlayer made of a silicon dioxide or the like, 509 designates a wiring layer made of Pt, Au, Al or aluminum alloy, 510 designates a pad metal layer made of AlCu or the like, and 511 designates a Ti/Ag reflective metal layer made of Ti and Ag.

The mirror 1 is constructed by the "Box" layer 502, the "Device" layer 503 serving as a vibration plate and the reflective metal layer 511 serving as a reflector. Note that, after the pad metal layer 510 is patterned, the reflective metal layer 511 is formed by forming a resist pattern of the reflective metal layer 511 using a photolithography process, depositing Ti and Ag on the resist pattern by a sputtering process, and carrying out a lift-off process to remove the resist pattern.

The fixed frame 2 is constructed by the "Handle" layer 501, the "Box" layer 502, the "Device" layer 503 and the insulating interlayer 508.

Each of the piezoelectric cantilevers 3a-1 to 3a-4 and 3b-1 to 3b-4 is constructed by the "Box" layer 502, the "Device" layer 503, the silicon dioxide layer 504, the lower electrode layer 505, the PZT layer 506 and the upper electrode layer 507.

The pads $P_{Ra}$, $P_{X1a}$, $P_{X2a}$, $P_{Rb}$, $P_{X1b}$ and $P_{X2b}$ are constructed by the pad metal layer 510.

The crossing bars 4 and 5 are constructed by the "Box" layer 502, the "Device" layer 503 and the insulating interlayer 508.

Since no additional process is required for forming the crossing bars 4 and 5, the manufacturing cost would not be increased.

The reinforcing rib 6 is constructed by performing a photolithography/etching process upon the "Handle" layer 501.

Figure 2:
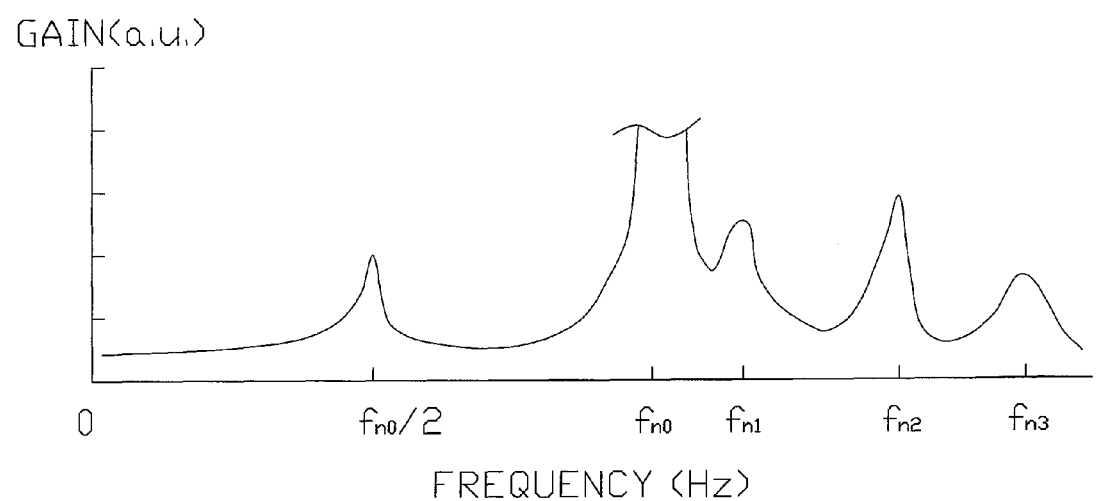
FIG. 2 is a graph showing the natural frequency characteristics of the operation modes of FIGS. 1A, 1B and 1C.
Figure 6:
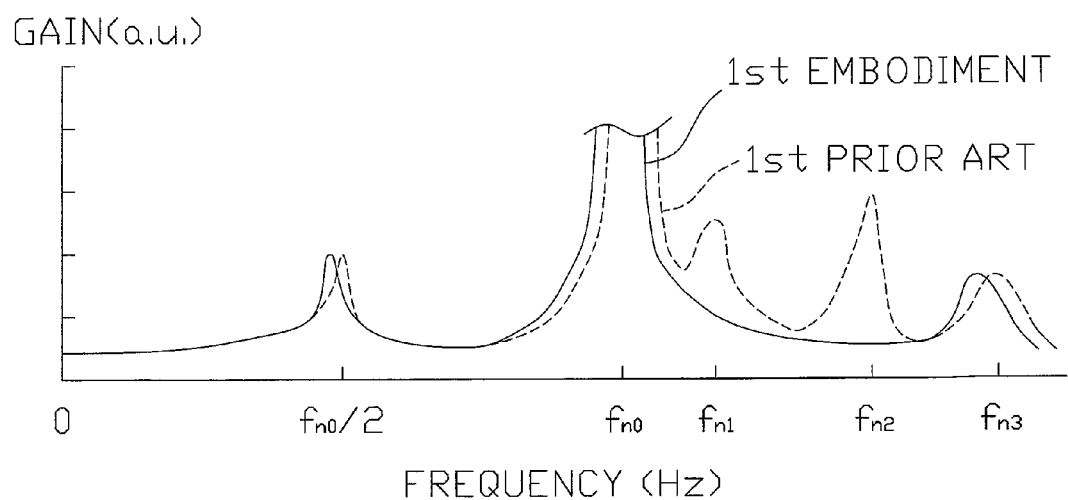
FIG. 6 is a graph showing the natural frequency characteristics of the operation modes of the optical deflector of FIGS. 3 and 4.

In FIG. 6, which shows the natural frequency characteristics of the optical deflector 10 of FIGS. 3 and 4, the natural frequency $f_{n1}$ of FIG. 2 caused by the Z-axis motions of the folded portions $Fa_{34}$ and $Fb_{34}$ opposite in phase to each other is moved away by the crossing bar 4, and the natural frequency $f_{n2}$ of FIG. 2 caused by the Z-axis motions of the folded portions $Fa_{23}$ and $Fb_{23}$ opposite in phase to each other is moved away by the crossing bar 5.

The meander-type piezoelectric actuators 3a and 3b are described below.

In the piezoelectric actuators 3a and 3b, the piezoelectric cantilevers 3a-1, 3a-2, 3a-3, 3a-4, 3b-1, 3b-2, 3b-3 and 3b-4 are divided into an odd-numbered group of the piezoelectric cantilevers 3a-1 and 3a-3; 3b-1 and 3b-3, and an even-numbered group of the piezoelectric cantilevers 3a-2 and 3a-4; 3b-2 and 3b-4 alternating with the odd-numbered group of the piezoelectric cantilevers 3a-1 and 3a-3; 3b-1 and 3b-3.

Figure 7A:
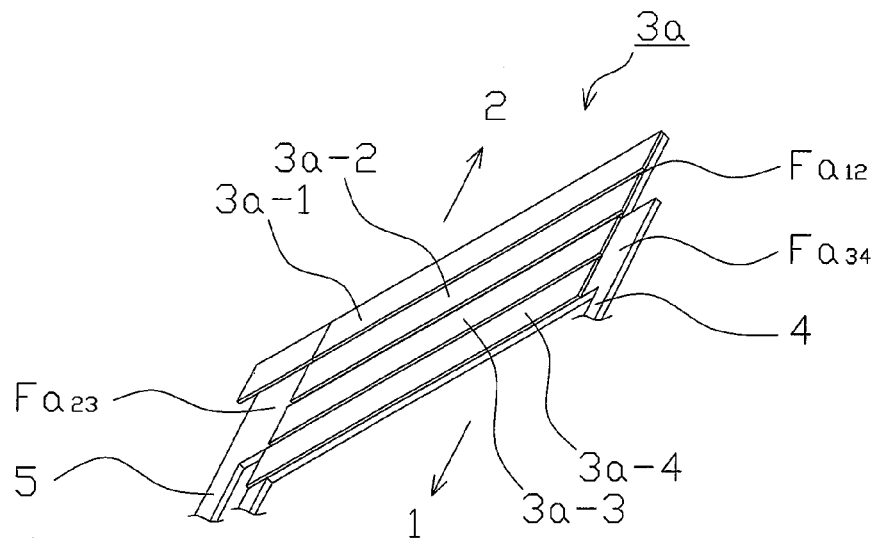
FIGS. 7A and 7B are perspective views for explaining an example of the operation of the piezoelectric cantilevers of FIGS. 3 and 4.
Figure 7B:
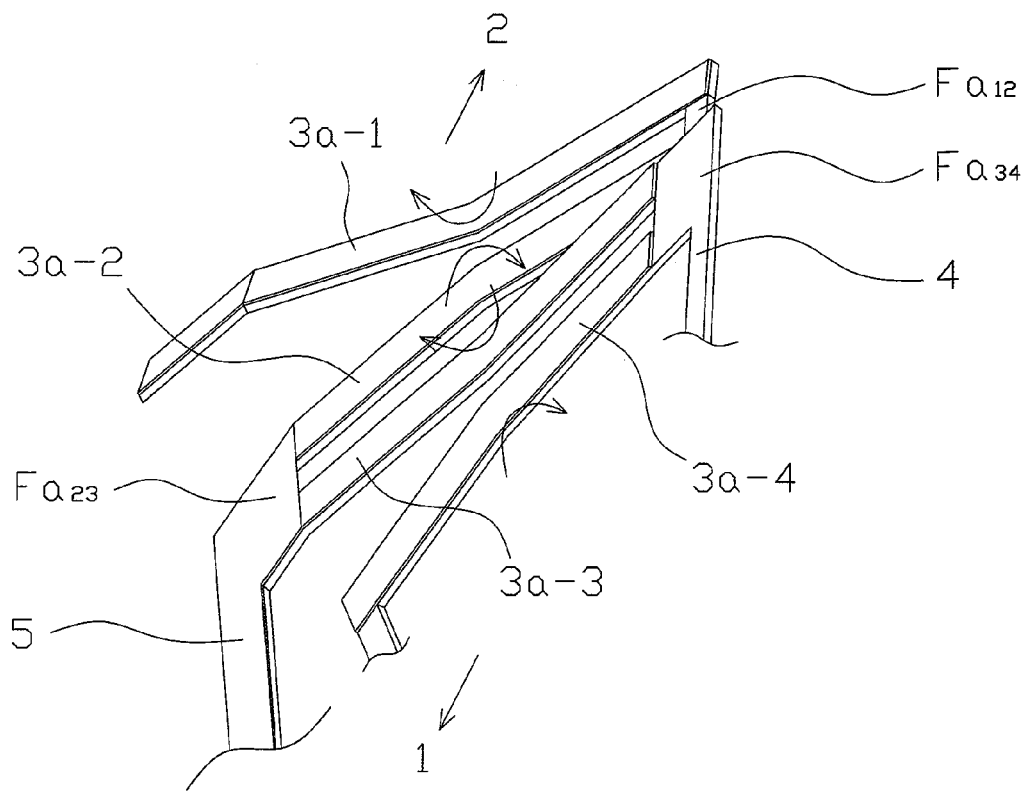

FIGS. 7A and 7B are perspective views for explaining the operation of the piezoelectric cantilevers of one piezoelectric actuator such as 3a of FIGS. 3 and 4. Note that FIG. 7A illustrates a non-operation state of the piezoelectric cantilevers 3a-1, 3a-2, 3a-3 and 3a-4 of the piezoelectric actuator 3a, and FIG. 7B illustrates an operation state of the piezoelectric cantilevers 3a-1, 3a-2, 3a-3 and 3a-4 of the piezoelectric actuator 3a.

For example, as illustrated in FIG. 7B which illustrates only the piezoelectric cantilevers 3a-1, 3a-2, 3a-3 and 3a-4, when the odd-numbered group of the piezoelectric cantilevers 3a-1, 3a-3, 3b-1 and 3b-3 are flexed in one direction, for example, in an upward direction, the even-numbered group of the piezoelectric cantilevers 3a-2, 3a-4, 3b-2 and 3b-4 are flexed in the other direction, i.e., in a downward direction. On the other hand, when the odd-numbered group of the piezoelectric cantilevers 3a-1, 3a-3, 3b-1 and 3b-3 are flexed in the downward direction, the even-numbered group of the piezoelectric cantilevers 3a-2, 3a-4, 3b-2 and 3b-4 are flexed in the upward direction.

Thus, the mirror 1 is rocked around the X-axis.

An optical deflection by rocking the mirror 1 around the X-axis is explained in detail with reference to FIGS. 8A, 8B and 8C.

Figure 9:
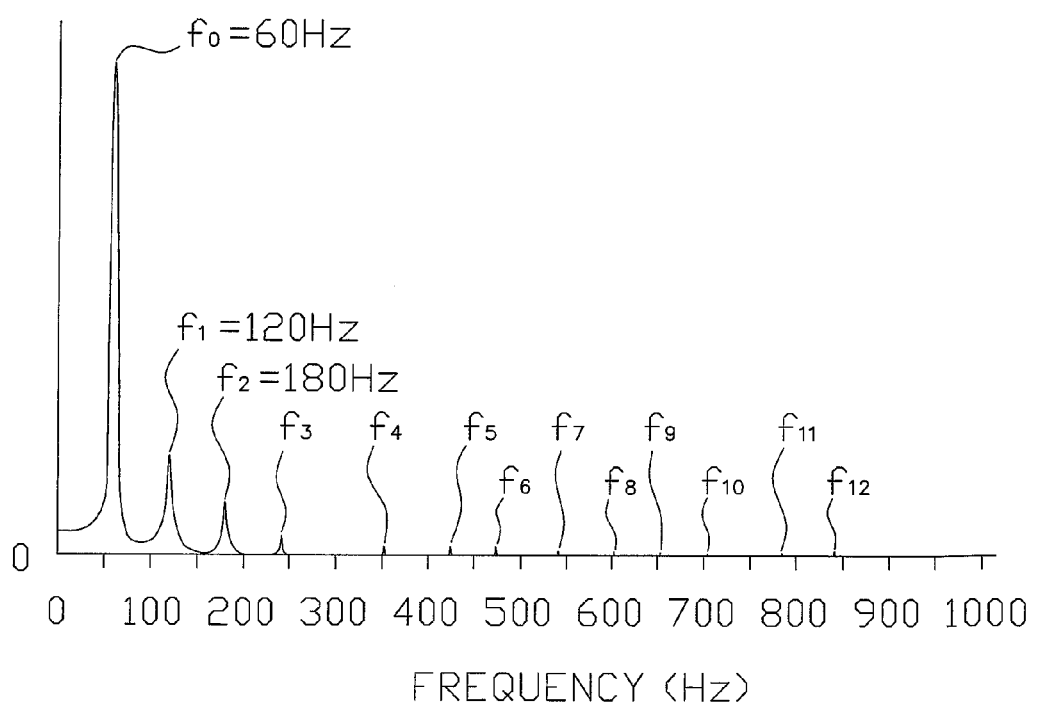
FIG. 9 is a frequency spectrum diagram of the drive voltages of the operation modes of the optical deflector of FIGS. 3 and 4.

For example, assume that the drive voltage $V_{X1}$ is sawtooth-shaped as illustrated in FIG. 8A and the drive voltage $V_{X2}$ is saw-tooth-shaped as illustrated in FIG. 8B. That is, the drive voltages $V_{X1}$ and $V_{X2}$ are opposite in phase to each other. In this case, the frequency characteristics of the drive voltages $V_{X1}$ and $V_{X2}$ whose basic frequency $f_0$ is 60 Hz are illustrated in FIG. 9.

Therefore, if the basic frequency $f_0$ of the drive voltages $V_{X1}$ and $V_{X2}$ is close to the natural frequency $f_{n0}$, the frequency $f_0$ would resonate with the natural frequency $f_{n0}$ to enhance the deflection angle $A_X$ of the mirror 1 around the X-axis. In addition, even if harmonic frequency components such as $f_1$ (=120 Hz) and $f_2$ (=180 Hz) of the drive voltages $V_{X1}$ and $V_{X2}$ are close to the natural frequencies $f_{n1}$ and $f_{n2}$ of FIG. 2, since the natural frequencies $f_{n1}$ and $f_{n2}$ are moved away by the crossing bars 4 and 5, the frequencies $f_{n1}$ and $f_{n2}$ would not appear in the deflection angle $A_X$ of the mirror 1 as illustrated in FIG. 8C.

According to the above-described first embodiment, since the crossing bars 4 and 5 are provided, the high harmonic components of the drive voltages $V_{X1}$ and $V_{X2}$ can be compensated for.

In the above-described first embodiment, another crossing bar can be provided along the X-axis on the positive side of the Y-axis to couple the folded portion $Fa_{12}$ to the folded portion $Fb_{12}$. This crossing bar is in parallel with the crossing bar 4.

Also, in the above-described first embodiment, the two crossing bars 4 and 5 are provided; however, only one crossing bar can be provided. In this case, the symmetrical displacements of the piezoelectric cantilevers 3a-3 and 3a-4 and the piezoelectric cantilevers 3b-3 and 3b-4 caused by the crossing bar 4 are larger than those of the piezoelectric cantilevers 3a-2 and 3a-3 and the piezoelectric cantilevers 3b-2 and 3b-3 caused by the crossing bar 5. Therefore, the crossing bar 4 is preferably provided as compared with the crossing bar 5.

Figure 1A:
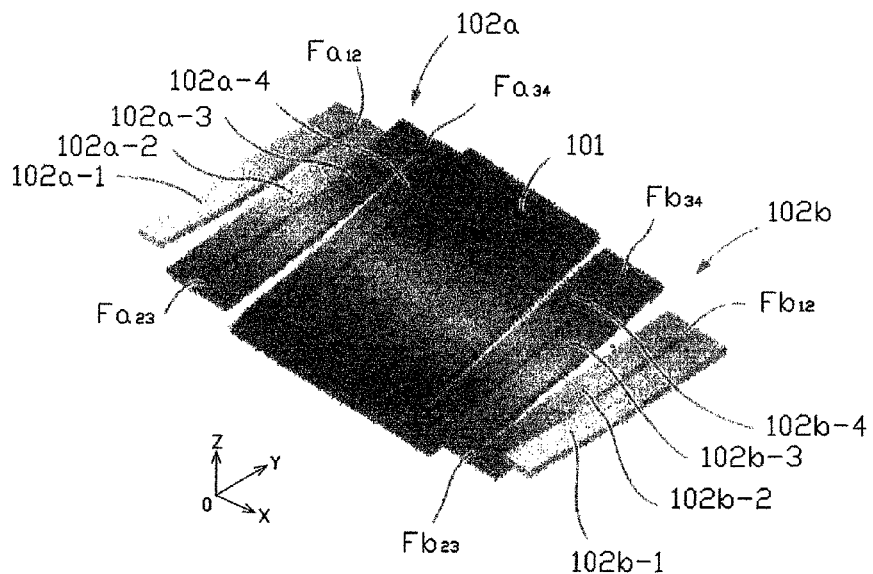
FIGS. 1A, 1B and 1C are perspective views for explaining operation modes of a first prior art optical deflector.
Figure 1B:
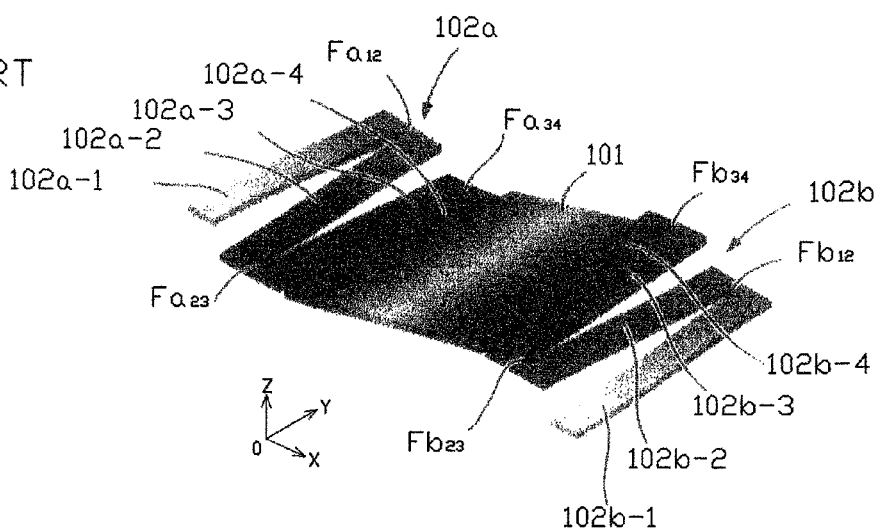
Figure 1C:
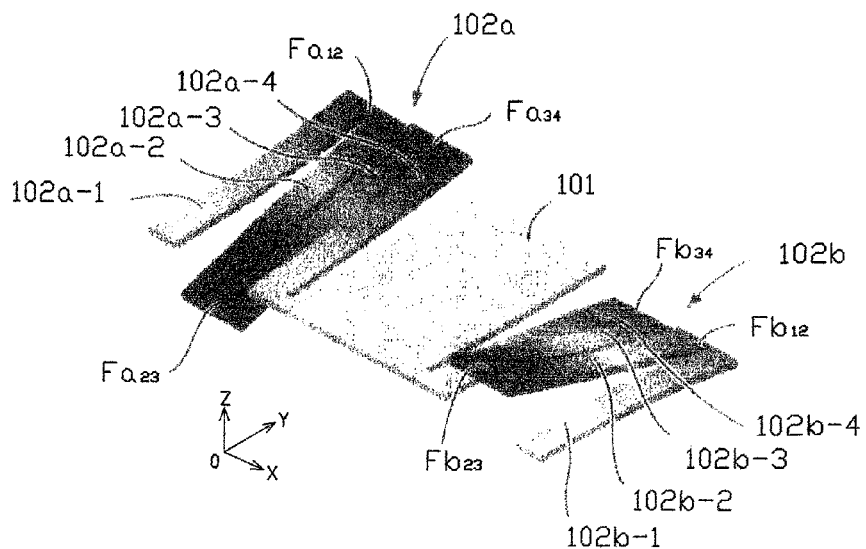
Figure 10:
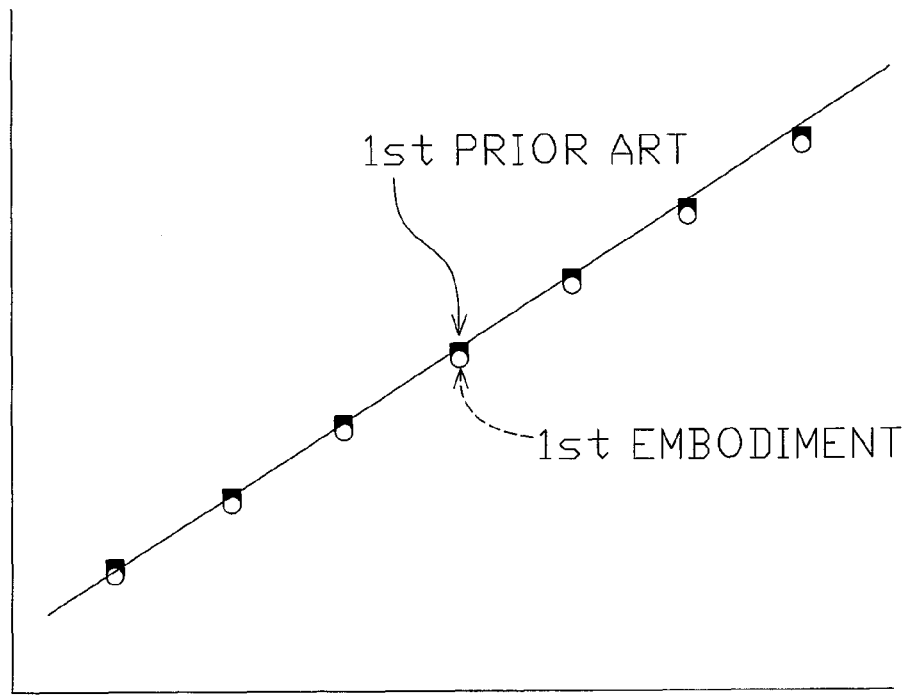
FIG. 10 is a graph showing the amplitude of the deflection angle of the optical deflector of FIGS. 3 and 4.

In FIG. 10, which shows the amplitude of the deflection angle $A_X$ of the optical deflector of FIGS. 3 and 4, the amplitude of the deflection angle $A_X$ is approximately the same as that of the first prior art optical deflector as illustrated in FIGS. 1A, 1B and 1C without the crossing bars 4 and 5. In more detail, the amplitude of the deflection angle $A_X$ is a little smaller than that of the first prior art optical deflector due to the increased mass of the movable part by the crossing bars 4 and 5; however, this would create no problem.

Also, since the crossing bars 4 and 5 keep the spacing between the piezoelectric cantilevers 3a-1, 3a-2 and 3a-3 and the piezoelectric cantilevers 3b-1, 3b-2 and 3b-3, the meander-type piezoelectric actuators 3a and 3b would not be displaced by an external impact, particularly, an impact along the Y-axis. As a result, the meander-type piezoelectric actuators 3a and 3b would not interfere with the mirror 1, and would not be twisted or deformed to be broken down.

Figure 11:
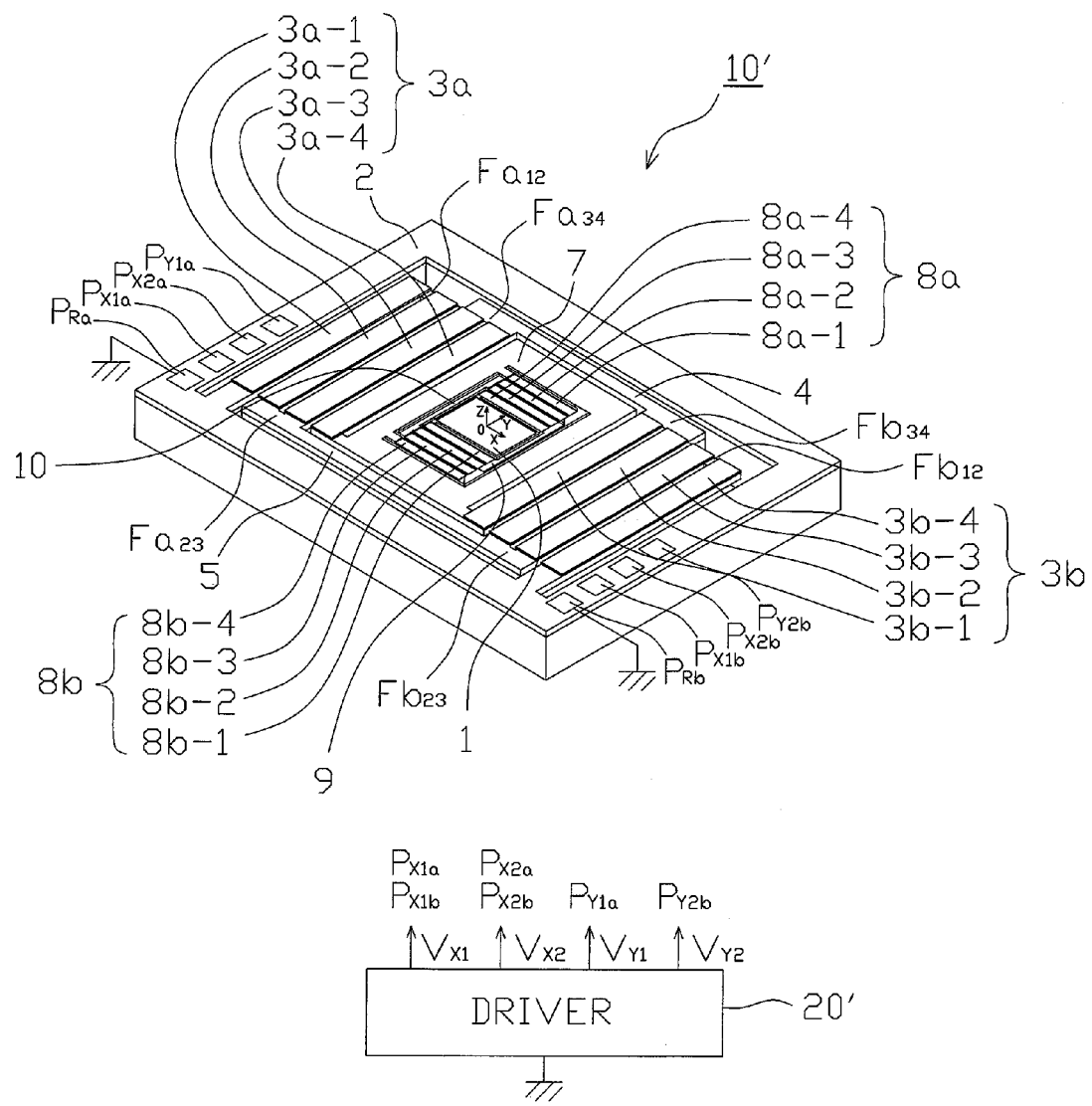
FIG. 11 is a view illustrating a second embodiment of the optical deflector according to the presently disclosed subject matter.
Figure 12:
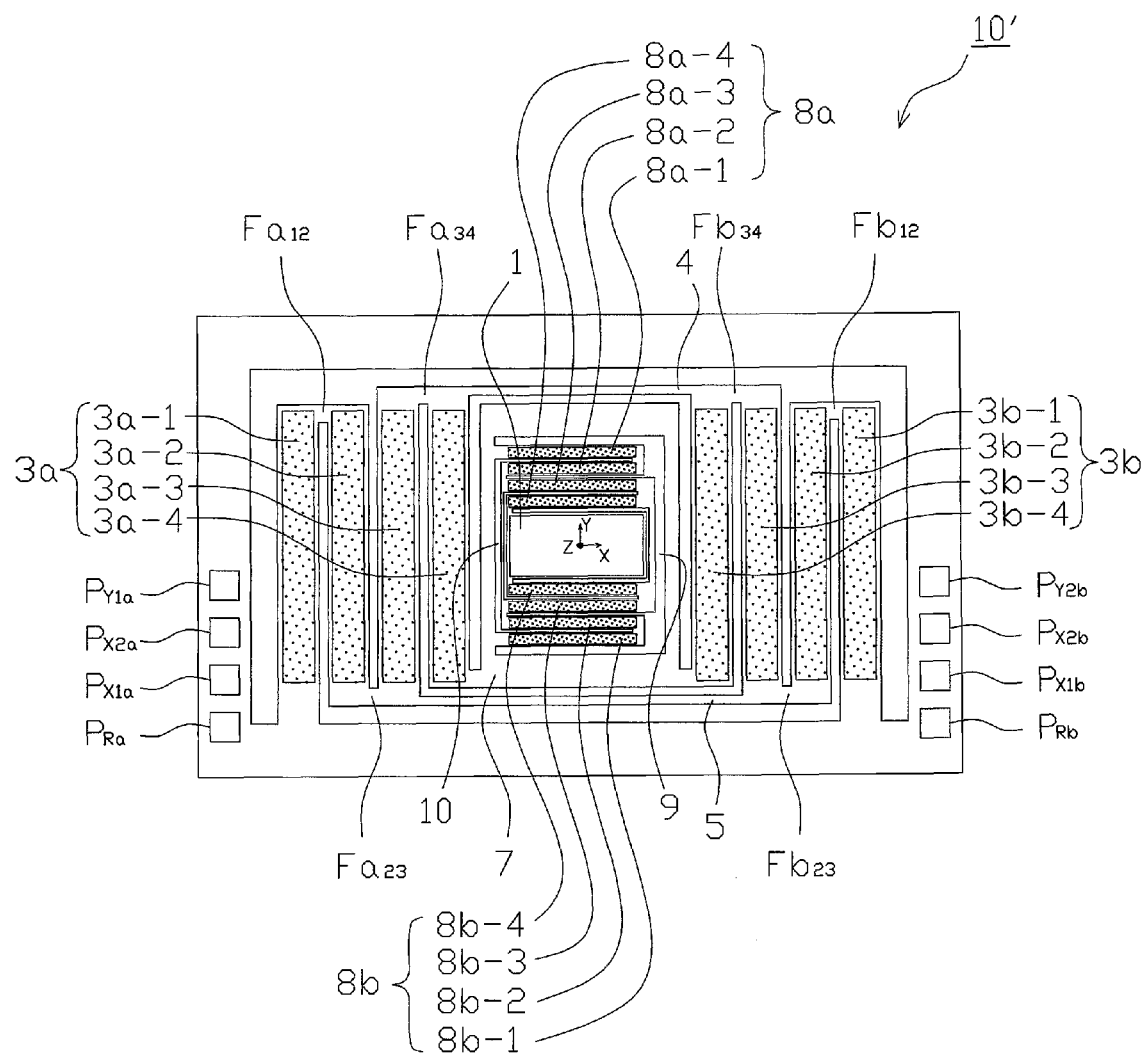
FIG. 12 is a plan view of the optical deflector of FIG. 11.

In FIGS. 11 and 12, which illustrate a second embodiment of the optical deflector according to the presently disclosed subject matter, reference numeral 10' designates a two-dimensional optical deflector, and 20' designates a driver for driving the optical deflector 10'.

The optical deflector 10' is constructed by a movable frame 7 surrounding the mirror 1, and a pair of inner meander-type piezoelectric actuators 8a and 8b coupled between the movable frame 7 and the mirror 1 and serving as cantilevers for rocking the mirror 1 around an Y-axis of the plane of the fixed frame 2 centered at the center of the mirror 1, in addition to the elements of the optical deflector 10 of FIGS. 3 and 4. The inner piezoelectric actuators 8a and 8b are arranged opposite to each other with respect to the mirror 1.

The inner piezoelectric actuator 8a is constructed by piezoelectric cantilevers 8a-1, 8a-2, 8a-3 and 8a-4 which are serially-coupled from the movable frame 7 to the mirror 1 via folded portions. Also, each of the piezoelectric cantilevers 8a-1, 8a-2, 8a-3 and 8a-4 are in parallel with the X-axis. Therefore, the piezoelectric cantilevers 8a-1, 8a-2, 8a-3 and 8a-4 are folded at every cantilever or meandering from the movable frame 7 to the mirror 1, so that the amplitudes of the piezoelectric cantilevers 8a-1, 8a-2, 8a-3 and 8a-4 can be changed along directions perpendicular to the Y-axis.

Similarly, the inner piezoelectric actuator 8b is constructed by piezoelectric cantilevers 8b-1, 8b-2, 8b-3 and 8b-4 which are serially-coupled from the movable frame 7 to the mirror 1 via folded portions. Also, each of the piezoelectric cantilevers 8b-1, 8b-2, 8b-3 and 8b-4 are in parallel with the X-axis. Therefore, the piezoelectric cantilevers 8b-1, 8b-2, 8b-3 and 8b-4 are folded at every cantilever or meandering from the movable frame 7 to the mirror 1, so that the amplitudes of the piezoelectric cantilevers 8b-1, 8b-2, 8b-3 and 8b-4 can be changed along directions perpendicular to the Y-axis.

Note that the number of piezoelectric cantilevers in each of the inner piezoelectric actuators 8a and 8b can be other values such as 2, 6, 8, . . . .

Also, provided on the fixed frame 2 are pads $P_{Y1a}$ and $P_{Y2b}$. The pads $P_{Y1a}$ and $P_{Y2b}$ are connected to the driver 20' which applies a drive voltage $V_{Y1}$ to the pad $P_{Y1a}$, and applies a drive voltage $V_{Y2}$ to the pad $P_{Y2b}$. In this case, the drive voltages $V_{Y1}$ and $V_{Y2}$ are opposite in phase to each other.

The pad $P_{Y1a}$ is connected via a wiring layer to the upper electrode layers of the odd-numbered piezoelectric cantilevers 8a-1, 8a-3, 8b-1 and 8b-3 of the inner piezoelectric actuators 8a and 8b.

The pad $P_{Y2b}$ is connected via a wiring layer to the upper electrode layers of the even-numbered piezoelectric cantilevers 8a-2, 8a-4, 8b-2 and 8b-4 of the inner piezoelectric actuators 8a and 8b.

A crossing bar 9 is provided along the Y-axis on the positive side of the Y-axis to couple a folded portion between the piezoelectric cantilevers 8a-3 and 8a-4 to a folded portion between the piezoelectric cantilevers 8b-3 and 8b-4, so as to prevent the Z-axis motion of one of the folded portions from being opposite to the Z-axis motion of the other of the folded portions. In this case, the Y-axis positions of these folded portions are fixed by the crossing bar 9.

Similarly, a crossing bar 10 is provided along the Y-axis on the negative side of the X-axis to couple a folded portion between the piezoelectric cantilevers 8a-2 and 8a-3 to a folded portion between the piezoelectric cantilevers 8b-2 and 8b-3, so as to prevent the Z-axis motion of one of the folded portion from being opposite to the Z-axis motion of the other of the folded portions. In this case, the Y-axis positions of the folded portions are fixed by the crossing bar 10.

The movable frame 7 is constructed by the "Handle" layer 501, the "Box" layer 502, the "Device" layer 503 and the insulating interlayer 508 of FIGS. 5A and 5B, in the same way as the fixed frame 2.

Each of the piezoelectric cantilevers 8a-1 to 8a-4 and 8b-1 to 8b-4 is constructed by the "Box" layer 502, the "Device" layer 503, the silicon dioxide layer 504, the lower electrode layer 505, the PZT layer 506 and the upper electrode layer 507 of FIGS. 5A and 5B, in the same way as the piezoelectric cantilevers 3a-1 to 3a-4 and 3b-1 to 3b-4. The pads $P_{Y1a}$ and $P_{Y2b}$ are constructed by the pad metal layer 510, in the same way as the pads $P_{Ra}$, $P_{X1a}$, $P_{X2a}$, $P_{Rb}$, $P_{X1b}$ and $P_{X2b}$.

The crossing bars 9 and 10 are constructed by the "Box" layer 502, the "Device" layer 503 and the insulating interlayer 508 of FIG. 5B, in the same way as the crossing bars 4 and 5.

Since no additional process is required for forming the crossing bars 9 and 10, the manufacturing cost would not be increased.

In the same way as the piezoelectric actuators 3a and 3b of FIGS. 3 and 4, the mirror 1 is rocked around the Y-axis by the inner piezoelectric actuators 8a and 8b.

An optical deflection by rocking the mirror 1 around the Y-axis is explained in detail with reference to FIGS. 13A, 13B and 13C.

Figure 13A:
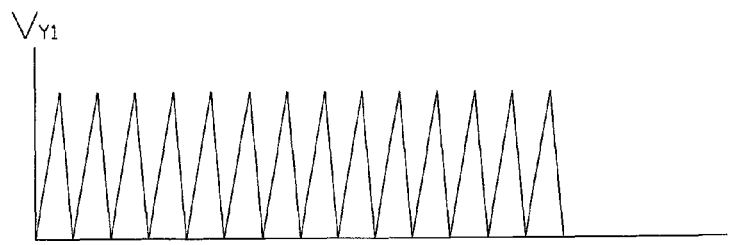
FIGS. 13A, 13B and 13C are timing diagrams for illustrating examples of the drive voltages and the deflection angle of the optical deflector of FIGS. 11 and 12.
Figure 13B:
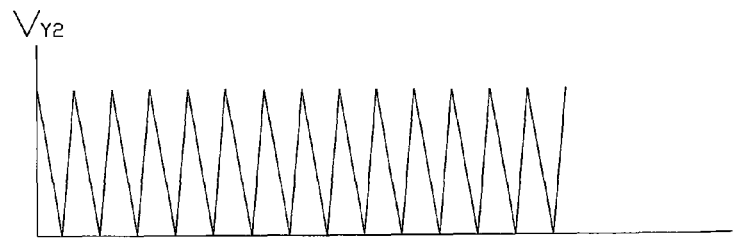
Figure 13C:
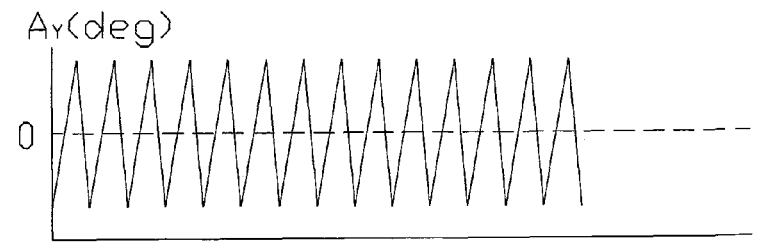

For example, assume that the drive voltage $V_{Y1}$ is saw-tooth-shaped as illustrated in FIG. 13A and the drive voltage $V_{Y2}$ is saw-tooth-shaped as illustrated in FIG. 13B. That is, the drive voltages $V_{Y1}$ and $V_{Y2}$ are opposite in phase to each other. In this case, the basic frequency $f_0'$ of the drive voltages $V_{Y1}$ and $V_{Y2}$ is 15 kHz.

Therefore, if the basic frequency $f_0'$ of the drive voltages $V_{Y1}$ and $V_{Y2}$ is close to a natural frequency $f_{n0}'$ in the normal mode, the frequency $f_0'$ would resonate with the natural frequency $f_{n0}'$ to enhance the deflection angle $A_Y$ of the mirror 1 around the Y-axis. In addition, even if harmonic frequency components of the drive voltages $V_{Y1}$ and $V_{Y2}$ are close to other natural frequencies which are moved away by the crossing bars 9 and 10, such other natural frequencies would not appear in the deflection angle $A_Y$ of the mirror 1 as illustrated in FIG. 13C.

Note that the natural frequency $f_{n0}'$ is a mechanically-vibrating system of the mirror 1 around the Y-axis depending upon the inner piezoelectric actuators 8a and 8b.

According to the above-described second embodiment, since the crossing bars 9 and 10 are provided, the high harmonic components of the drive voltages $V_{Y1}$ and $V_{Y2}$ can be compensated for.

In the above-described second embodiment, another crossing bar can be provided along the Y-axis on the positive side of the X-axis to couple the folded portion between the piezoelectric cantilevers 8a-1 and 8a-2 to the folded portion between the piezoelectric cantilevers 8b-1 and 8b-2. This crossing bar is in parallel with the crossing bar 9.

Also, in the above-described second embodiment, the two crossing bars 9 and 10 are provided; however, only one crossing bar can be provided. In this case, the symmetrical displacements of the piezoelectric cantilevers 8a-3 and 8a-4 and the piezoelectric cantilevers 8b-3 and 8b-4 caused by the crossing bar 9 are larger than those of the piezoelectric cantilevers 8a-2 and 8a-3 and the piezoelectric cantilevers 8b-2 and 8b-3 caused by the crossing bar 10. Therefore, the crossing bar 9 is preferably provided as compared with the crossing bar 10.

Also, the amplitude of the deflection angle $A_Y$ becomes a little smaller due to the increased mass of the movable part by the crossing bars 9 and 10; however, this would create no problem.

Further, since the crossing bars 9 and 10 keep the spacing between the piezoelectric cantilevers 8a-1, 8a-2 and 8a-3 and the piezoelectric cantilevers 8b-1, 8b-2 and 8b-3, the meander-type inner piezoelectric actuators 8a and 8b would not be displaced by an external impact, particularly, an impact along the X-axis. As a result, the meander-type inner piezoelectric actuators 8a and 8b would not interfere with the mirror 1, and would not be twisted or deformed to be broken down.

In the above-described second embodiment, the inner piezoelectric actuators 8a and 8b of a meander-type can be replaced by piezoelectric actuators of a torsion bar type for rocking the mirror through torsion bars.

In FIG. 14, the two-dimensional optical deflector of FIGS. 11 and 12 is applied to an image display apparatus. This image display apparatus is constructed by the two-dimensional optical deflector 10' and the driver 20' of FIGS. 11 and 12, a laser source 30, a half mirror (beam splitter) 40 and a screen 50. In this case, the laser source 30, the half mirror 40 and the screen 50 are fixed at predetermined locations. Light L1 outputted from the laser source 30 is modulated to pass through condensing lenses (not shown) and then, through the half mirror 40 to reach the mirror of the optical deflector 10'. Then, light L2 reflected by the mirror of the optical deflector 10' is deflected by the deflection angle of the mirror thereof and is split at the half mirror 40 to project on the screen 50. The screen 50 is raster-scanned with the light L2 deflected by the optical deflector 10' in a horizontal direction H and in a vertical direction V as indicated within the screen 50.

In the above-described first and second embodiments, the basic frequencies of the drive voltages are close to the natural frequencies of the mirror 1 in the normal modes; however, when a vector scanning operation is carried out, it is unnecessary to rock the mirror 1 at such natural frequencies.

The optical deflector according to the presently disclosed subject matter can be applied to a light scanner such as an electronic photo type printer and a laser printer, a laser head amplifier, a sensing light scanner such as a laser radar, a bar code reader, a headup display apparatus, an area sensor or a touch panel, in addition to the image display apparatus of FIG. 14.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
a mirror;
a fixed frame surrounding said mirror; and
first and second piezoelectric actuators of a meander-type provided opposite to each other with respect to said mirror, for rocking said mirror around a first axis on a plane of said fixed frame,
said first piezoelectric actuator including a plurality of first piezoelectric cantilevers folded at first folded portions and coupled to said fixed frame,
said second piezoelectric actuator including a plurality of second piezoelectric cantilevers folded at second folded portions and coupled to said fixed frame,
said optical deflector further comprising a first crossing bar coupled between one of said first folded portions and one of said second folded portions symmetrically located with respect to said mirror.

2. The optical deflector as set forth in claim 1, further comprising a second crossing bar coupled between another of said first folded portions and another of said second folded portions symmetrically located with respect to said mirror.

3. The optical deflector as set forth in claim 1, wherein the one of said first folded portions and the one of said second folded portions are closest ones to said mirror.

4. The optical deflector as set forth in claim 2, wherein the one of said first folded portions and the one of said second folded portions are closest ones to said mirror, and the other of said first folded portions and the other of said second folded portions are second closest ones to said mirror,
said first and second crossing bars being located oppositely to each other with respect to a second axis perpendicular to said first axis on the plane of said fixed frame.

5. The optical deflector as set forth in claim 1, further comprising:
a movable frame, provided between said first and second piezoelectric actuators and said mirror; and
third and second piezoelectric actuators provided opposite to each other with respect to said mirror, for rocking said mirror around a second axis on the plane of said fixed frame, said second axis being perpendicular to said first axis.

6. The optical deflector as set forth in claim 5, wherein said third piezoelectric actuator is of a meander-type which includes a plurality of third piezoelectric cantilevers folded at third folded portions and coupled from said movable frame to said mirror,
wherein said fourth piezoelectric actuator is of a meander-type which includes a plurality of fourth piezoelectric cantilevers folded at fourth folded portions and coupled from said movable frame to said mirror,
said optical deflector further comprising a third crossing bar coupled between one of said third folded portions and one of said fourth folded portions symmetrically located with respect to said mirror.

7. The optical deflector as set forth in claim 6, further comprising a fourth crossing bar coupled between another of said third folded portions and another of said fourth folded portions symmetrically located with respect to said mirror.

8. The optical deflector as set forth in claim 6, wherein the one of said third folded portions and the one of said fourth folded portions are closest ones to said mirror.

9. The optical deflector as set forth in claim 7, wherein the one of said third folded portions and the one of said fourth folded portions are closest ones to said mirror, and the other of said third folded portions and the other of said fourth folded portions are second closest ones to said mirror,
said third and fourth crossing bars being located oppositely to each other with respect to a second axis perpendicular to said first axis on the plane of said fixed frame.

* * * * *